US007852381B2

(12) United States Patent
Abe

(10) Patent No.: US 7,852,381 B2
(45) Date of Patent: Dec. 14, 2010

(54) IMAGE SIGNAL PROCESSOR WITH WHITE BALANCE CALCULATION BASED UPON SELECTED PREDICTION AREA

(75) Inventor: Tetsuya Abe, Tokyo (JP)

(73) Assignee: Hoya Corporation, Tokyo (JP)

( * ) Notice: Subject to any disclaimer, the term of this patent is extended or adjusted under 35 U.S.C. 154(b) by 1160 days.

(21) Appl. No.: 11/428,104

(22) Filed: Jun. 30, 2006

(65) Prior Publication Data

US 2007/0002150 A1 Jan. 4, 2007

(30) Foreign Application Priority Data

Jul. 1, 2005 (JP) ............................ 2005-193944

(51) Int. Cl.
*H04N 9/73* (2006.01)

(52) U.S. Cl. .................................................. 348/224.1

(58) Field of Classification Search .... 348/223.1–225.1
See application file for complete search history.

(56) References Cited

U.S. PATENT DOCUMENTS

| | | | | |
|---|---|---|---|---|
| 5,132,825 | A | 7/1992 | Miyadera | |
| 5,526,048 | A | 6/1996 | Yamamoto | |
| 6,094,539 | A | 7/2000 | Abe | |
| 6,343,190 | B1 | 1/2002 | Abe | |
| 6,727,942 | B1 * | 4/2004 | Miyano | 348/223.1 |
| 7,199,821 | B2 | 4/2007 | Miyao et al. | |
| 7,551,209 | B2 | 6/2009 | Miyao et al. | |
| 2003/0160876 | A1 * | 8/2003 | Miyao et al. | 348/223.1 |
| 2006/0087566 | A1 | 4/2006 | Abe | |
| 2007/0159537 | A1 | 7/2007 | Miyao et al. | |

FOREIGN PATENT DOCUMENTS

| | | |
|---|---|---|
| JP | 05-344530 | 12/1993 |
| JP | 07-298286 | 11/1995 |
| JP | 2000-092509 | 3/2000 |
| JP | 2001-211457 | 8/2001 |
| JP | 2002-315015 | 10/2002 |
| JP | 2003-259389 | 9/2003 |
| JP | 2004-328460 | 11/2004 |

OTHER PUBLICATIONS

English language Abstract of JP 2001-211457.

* cited by examiner

*Primary Examiner*—Timothy J Henn
(74) *Attorney, Agent, or Firm*—Greenblum & Bernstein P.L.C.

(57) ABSTRACT

An image signal processor comprising an image signal receiver and a white balance processing block is provided. The image signal receiver receives an image signal. The image signal is generated by an imaging device when the imaging device captures an optical image of an object. The imaging device captures the optical image of the object through a photographic optical system. The photographic optical system has a focus optical system. The focus optical system focuses the optical image on a light receiving surface of the imaging device. The photographic optical system is housed in a lens unit with a detector. The detector finds an object distance based on a location of the focus optical system in the photographic optical system. The white balance processing block carries out a white balance process for the image signal, based on a photographing magnification of the photographic optical system, the object distance, and the light intensity of the optical image as the image signal is generated.

16 Claims, 7 Drawing Sheets

MONITOR
MONITOR DRIVER
MONITOR I/F
CARD I/F
CONNECTOR
MEMORY CARD
RELEASE SWITCH
AE/AF SWITCH
MODE SWITCH
POWER SWITCH
IMAGE MEMORY
IMAGE SIGNAL PROCESSOR
SYSTEM CONTROLLER
A/D
CDS/AGC
IMAGING DEVICE DRIVER
SHUTTER DRIVER
MIRROR DRIVER
DIAPHRAGM DRIVER
LENS DRIVER
PHOTOMETRY SENSOR
AF SENSOR
IMAGING DEVICE
DETECTOR
LENS MEMORY
10
20
41
41Z
41F
42
43
44
45
46
47
48
49
50
51
52
53
54
55
56
57
58
59
60
61
62
63
64
65
66
67
68
69

IMAGE MEMORY
45
I/F OUTPUT BLOCK
30
20
Cr/Cb
Y
COLOR SIGNAL BLOCK
29
Cr/Cb
Cr/Cb
EDGE ENHANCEMENT BLOCK
28
Y
Y
YC PROCESS BLOCK
27
GAMMA CORRECTION BLOCK
26
B G R
B G R
COLOR SEPARATION BLOCK
22
WHITE BALANCE BLOCK
23
COLOR CORRECTION BLOCK
25
R G B
R G B
Rg
Bg
I/F INPUT BLOCK
21
GAIN CALCULATION BLOCK
24
OBJECT DISTANCE
FOCAL LENGTH
AMOUNT OF LIGHT INTENSITY
IMAGE SIGNAL

IMAGE SIGNAL PROCESSOR WITH WHITE BALANCE CALCULATION BASED UPON SELECTED PREDICTION AREA

BACKGROUND OF THE INVENTION

1. Field of the Invention

The present invention relates to an image signal processor that carries out a white balance process on image signals generated by an imaging device.

2. Description of the Related Art

A digital camera, which carries out a white balance process on image signals generated when photographing, is known. Further, a digital camera, which has a number of photographing-modes adequate to various situations and which carries out the white balance process according to a photographing-mode set up by the user, is proposed.

SUMMARY OF THE INVENTION

However, for any user setting up a photographing-mode is troublesome. Further, it is problematic that the digital camera inadequately carries out the white balance process if the photographing-mode, set up by a user, does not match the situation where the user takes a photo.

Therefore, an object of the present invention is to provide an image signal processor that carries out a white balance process adequate for a practical situation where a user takes a photo.

According to the present invention, an image signal processor comprising an image signal receiver and a white balance processing block is provided. The image signal receiver receives an image signal. The image signal is generated by an imaging device when the imaging device captures an optical image of an object through a photographic optical system. The photographic optical system has a focus optical system. The focus optical system focuses the optical image on a light receiving surface of the imaging device. The photographic optical system is housed in a lens unit. The lens unit has a detector to find an object distance. The object distance is found based on a location of the focus optical system in the photographic optical system. The white balance processing block carries out a white balance process for the image signal. The white balance process is carried out based on a photographing magnification of the photographic optical system, the object distance, and light intensity of the optical image as the image signal is generated by the imaging device.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
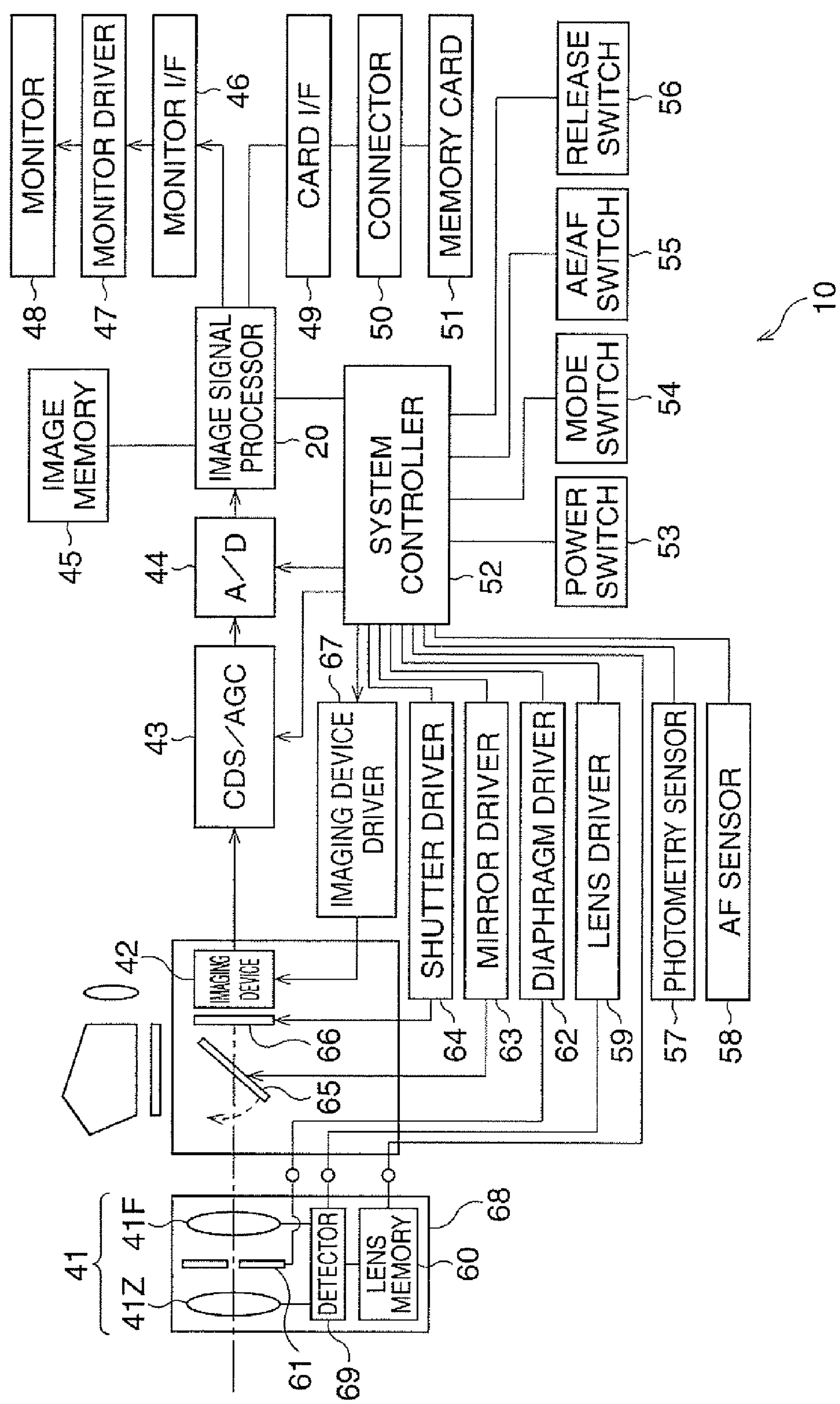
FIG. 1 is a block diagram showing the internal structure of a digital camera having an image signal processor of an embodiment of the present invention.

The present invention is described below with reference to the embodiment shown in the drawings.

In FIG. 1, a digital camera 10 comprises a lens unit 68, an imaging device 42 such as a CCD, an image signal processor 20, a system controller 52, a monitor 48, and so on.

The photographic optical system 41, which is housed in the lens unit 68, is optically connected to the imaging device 42. Between the photographic optical system 41 and the imaging device 42, a mirror 65 and a shutter 66 are mounted. The mirror 65 and the shutter 66 open for taking a photo. Then, an optical image of an object through the photographic optical system 41 is captured by a light receiving surface of the imaging device 42.

A plurality of pixels is arranged at a light receiving surface of the imaging device 42 in a matrix. Each pixel is covered by one color filter element of the R (red), G (green), and B (blue) color filter elements (not depicted). Each pixel generates a pixel signal according to an amount of light received at each pixel. Pixel signals, generated by a plurality of pixels that accord to one frame of the photographed image, form the image signal. The image signal is output from the imaging device 42.

The image signal output from the imaging device 42 is sent to a CDS/AGC circuit 43. The CDS/AGC circuit carries out correlated double sampling and auto gain control for the image signal. Then, the image signal is sent to an A/D converter 44. The A/D converter 44 converts the image signal, which is an analogue signal, to a digital signal. After A/D conversion, the image signal is sent to the image signal processor 20.

The image signal sent to the image signal processor 20 is stored by an image memory 45, which is a work memory for signal processing. The image signal processor carries out some predetermined signal processes, such as a white balance process described later, for the image signal stored in the image memory 45.

The image signal processor 20 is electrically connected to a monitor driver 47 through a monitor I/F 46. The image signal is sent to the monitor driver 47 from the image signal processor 20 after predetermined signal processes. The monitor driver 47 drives the monitor 48 so that an image, corresponding to the image signals sent to the monitor driver 47, is displayed on the monitor 48.

In addition, the image signal processor 20 can be electrically connected to a memory card 51 through a card I/F 49 and a connector 50. The memory card 51 can be connected to and disconnected from the connector 50 as necessary. The image signal, sent from the image signal processor 20, can be stored on the memory card 51.

The digital signal processor 20 is electrically connected to the system controller 52. The system controller 52 causes the image signal processor 20 to adequately carry out the signal processes. In addition, the system controller 52 causes the digital camera 10 to carry out some movements arranged for the digital camera 10.

The system controller 52 is electrically connected to a power switch 53, a mode switch 54, an AE/AF switch 55, and a release switch 56. By switching the power switch 53 on or off, the digital camera 10 is switched on or off. A number of photographing-modes according to some photographing situations are set up for the digital camera 10. By manipulating the mode switch 54, one photographing-mode is selected from the photographing-modes already set up. By switching on the AE/AF switch 55, a number of operations for an auto exposure and an auto focus are carried out, described in detail as follows.

The system controller 52 is electrically connected to a photometry sensor 57 and an AF sensor 58. When the AE/AF switch 55 is switched on, the degree of light intensity of the object is measured by the photometry sensor 57 and a defocusing distance of the photographic optical system 41 is measured by the AF sensor 58. Data for the measured degree of light intensity and defocusing distance are sent to the system controller 52.

Incidentally, an optical image of an object passing through the photographic optical system 41 is reflected by a half mirror (not depicted) mounted in the mirror 65 when the mirror 65 is closed. Then, the optical image of the object is incident to the AF sensor 58. The AF sensor is located so that the optical distance between the photographic optical system 41 and the AF sensor 58, when closing the mirror 65, can be equal to the optical distance between the photographic optical system 41 and the imaging device 42.

The photographic optical system 41 comprises a number of lenses forming a zooming optical system 41Z for adjustment of focal length and a focus optical system 41F that focuses the optical image. The zooming optical system 41Z and the focus optical system 41F are separately supported and moved by a lens driving mechanism (not depicted), housed in the lens unit 68, along the optical axis of the photographic optical system 41.

The lens driving mechanism has a driving motor (not depicted) for movement of the optical systems 41Z, 41F, and a location detector 69. The driving motor and the location detector 69 are electrically connected to a lens driver 59. The relative locations of the zooming optical system 41Z and the focus optical system 41F in the photographic optical system 41 are detected by the location detector 69. Data for the relative locations are sent to the lens driver 59. The relative location of the focus optical system 41F is detected as the distance from a standard position. When the relative location of the focus optical system 41F is the standard position, an optical image of an object infinitely far apart from the photographic optical system 41 can be focused on the light receiving surface of the imaging device 42.

The lens driver 59 is electrically connected to the system controller 52. Based on the defocusing degree measured by the AF sensor 58, the system controller calculates a distance to move the focus optical system 41F from the original location to a location-in-focus, where the optical image of an object is focused on the light receiving surface.

Data for the distance to move the focus optical system 41F is sent to the lens driver 59. Then, the lens driver 59 causes the driving motor to move the focus optical system 41F to the location-in-focus.

The location detector 69 is electrically connected to a lens memory 60, housed in the lens unit 68. The lens memory 60 stores a first table-data, which has data for the relative location of the focus optical system 41F and for the object distance corresponding to the relative location. Based on the actual relative location of the focus optical system 41F and the first table-data, the lens memory 60 finds the object distance corresponding to the actual relative location of the focus optical system 41F. The object distance is sent to the system controller 52 as a distance-information.

Further, the lens memory 60 stores a second table-data, which has data for the relative location of the zooming optical system 41Z and for the focal length corresponding to the relative location. Based on the actual relative location of the zooming optical system 41Z and the second table-data, the lens memory 60 finds the focal length corresponding to the actual relative location of the zooming optical system 41Z. The focal length is sent to the system controller 52 as focal-length-information.

A diaphragm 61 is mounted between the zooming optical system 41Z and the focus optical system 41F. An aperture ratio of the diaphragm 61 is controlled by the diaphragm driver 62.

The diaphragm driver 62 is electrically connected to the system controller 52. Data for the degree of light intensity measured by the photometry sensor 57 is sent to the diaphragm driver 62 through the system controller 52. Based on the degree of light intensity, the diaphragm driver 62 determines the aperture ratio of the diaphragm 61.

The system controller 52 is electrically connected to a mirror driver 63 and a shutter driver 64. By switching on the release switch 56, the system controller 52 controls the mirror driver 63 and the shutter driver 64 so that the mirror 65 and the shutter 66 can open.

In addition, by switching on the release switch 56, the system controller 52 controls an imaging device driver 67 so that the imaging device 42 can generate one frame of the image signal.

Also, by switching on the release switch 56, the distance-information, the focal-length-information, and the light-amount-information corresponding to the measured amount of light intensity, when the imaging device generates the image signal, are sent to the image signal processor 20 from the system controller 52.

Figure 2:
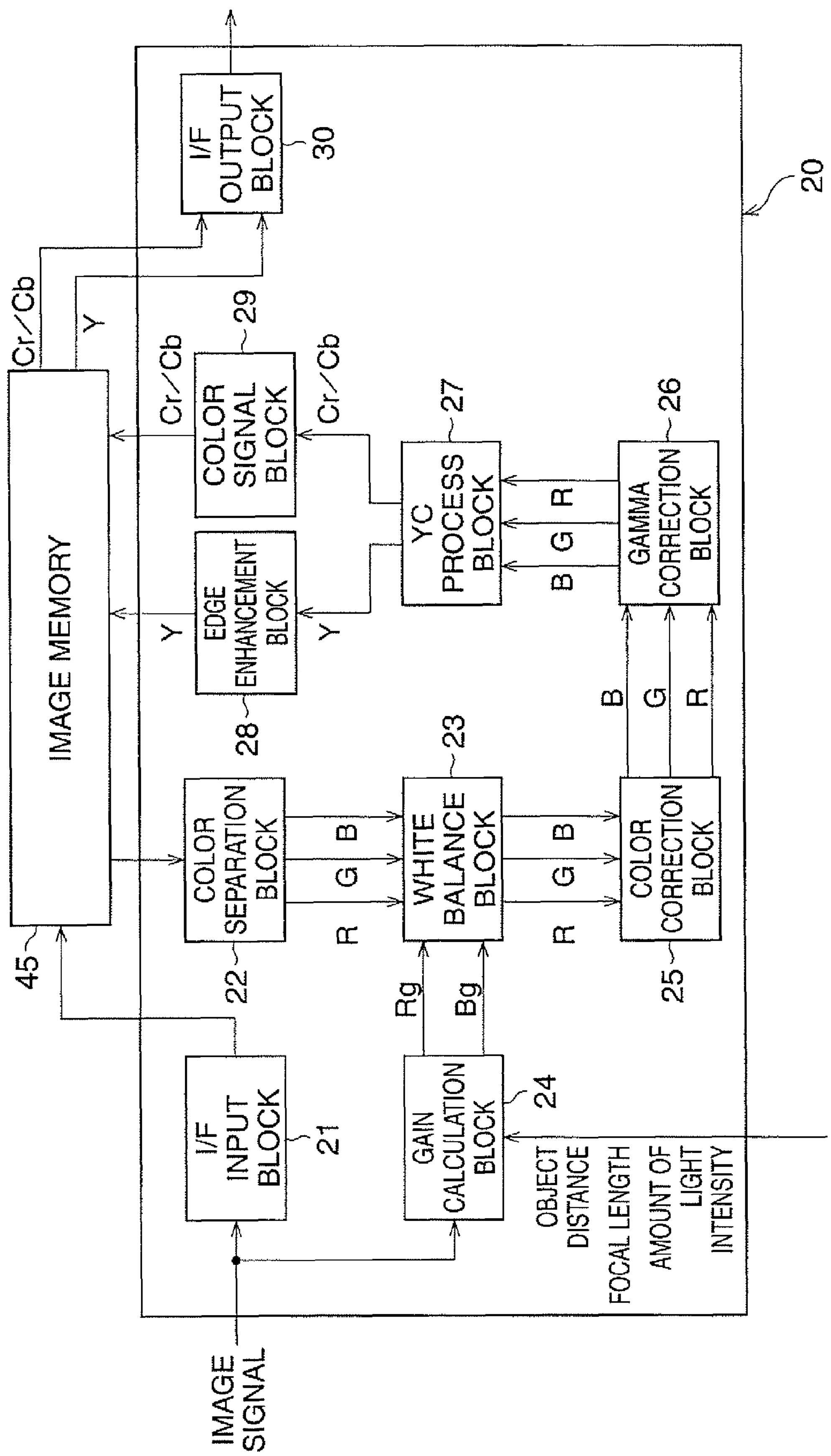
FIG. 2 is a block diagram showing the internal structure of an image signal processor.

Next, the structure of the image signal processor is explained using the block diagram showing the internal structure of the image signal processor (see FIG. 2). The image signal processor 20 comprises an I/F input block 21, a color separation block 22, a white balance block 23, a gain calculation block 24, a color correction block 25, a gamma correction block 26, a YC process block 27, an edge enhancement block 28, a color signal block 29, and an I/F output block 30.

The image signal, which is converted to a digital signal by the A/D converter 44, is input to the I/F input block 21. The image signal is sent to the image memory 45 from the I/F input block 21, and then the image memory 45 stores the image signal. The image signal stored by the image memory 45 is read by the color separation block 22. The image signal is separated into an R signal, a G signal, and a B signal, corresponding to red, green, and blue light components respectively.

The R signal, the G signal, and the B signal are input to the white balance block 23. Further, the white balance block 23 receives data for an R gain (hereinafter referred to as an Rg) and for a B gain (hereinafter referred to as a Bg), described in detail later, from the gain calculation block 24. Based on the Rg and the Bg, a white balance process for the R signal, the G signal, and the B signal is carried out.

The R signal, the G signal, and the B signal, for which the white balance process is carried out, are sent to the color correction block 25, and then a color correction process is carried out for them. The R signal, the G signal, and the B signal, for which the color correction process is carried out, are sent to the gamma correction block 26, and then a gamma correction process is carried out for them. The R signal, the G signal, and the B signal, for which the gamma correction process is carried out, are sent to the YC process block 27, and then a luminance signal (hereinafter referred to as Y) and color difference signals (hereinafter referred to as Cr and Cb) are generated based on the R signal, the G signal, and the B signal.

The Y is sent to the edge enhancement block 28, and then an edge enhancement process is carried out for the Y. The Y, for which the edge enhancement process is carried out, is stored by the image memory 45. The Cr and Cb are sent to the color signal block 29, and then a color signal process is carried out for the Cr and Cb. The Cr and Cb, for which the color signal process is carried out, are stored by the image memory 45.

The Y, the Cr, and the Cb, stored by the image memory, are sent to the monitor I/F 46 or the card I/F 49 through the I/F output block 30.

Next, it is explained how the gain calculation block 24 calculates the Rg and the Bg for the white balance process.

The image signal, which is converted to a digital signal by the A/D converter 44, is also input to the gain calculation block 24. The gain calculation block 24 carries out a color separation process, an add-up process, and a YC process for the image signal, and then an add-up-luminance signal (hereinafter referred to as aY) and add-up-color difference signals (hereinafter referred to as aCr and aCb) are generated. Further, the gain calculation block 24 carries out a gain calculation process based on the aY, the aCr, and the aCb, and then the Rg and the Bg are calculated.

The color separation process, the add-up process, the YC process, and the gain calculation process carried out by the gain calculation block 24 are explained below in detail.

By carrying out the color separation process, the image signal is separated into an R signal, a G signal, and a B signal in the same way as in the color separation block 22. Each of the numbers of R signals, G signals, and B signals is equal to the number of pixels arranged in the imaging device 42.

For the add-up process, some add-up areas are set up on the light receiving surface of the imaging device 42. For example, the light receiving surface is divided vertically into 16 areas and horizontally into 16 areas, and thus 256 add-up areas are formed. More than 16 pixels are vertically and horizontally arranged on the light receiving surface. In addition, each add-up area includes a number of pixels. An R add-up value is calculated by adding up signal levels of the R signals generated by the pixels included in a single add-up area. Similarly, a G add-up value is calculated by adding up signal levels of the G signals generated by the pixels included in a single add-up area. Similarly, a B add-up value is calculated by adding up signal levels of the B signals generated by the pixels included in a single add-up area. The R add-up value, the G add-up value, and the B add-up value are calculated for each of the 256 add-up areas.

By carrying out the YC process, the aY, the aCr, and the aCb are generated based on the R add-up values, the G add-up values, and the B add-up values. The Y, the Cr, and the Cb are generated for each pixel in the YC process block 27, but the aY, the aCr, and the aCb are generated for each of the 256 add-up areas in the gain calculation block 24.

Initially in the gain calculation process next to the YC process, the aCr and the aCb are converted into converted color difference signals (hereinafter referred to as cCr and cCb), corresponding to a standard luminance signal (hereinafter referred to as sY). The signal level of the sY is predetermined, and can be set, for example, to a median signal level in the detectable signal level range for the aY.

Figure 3:
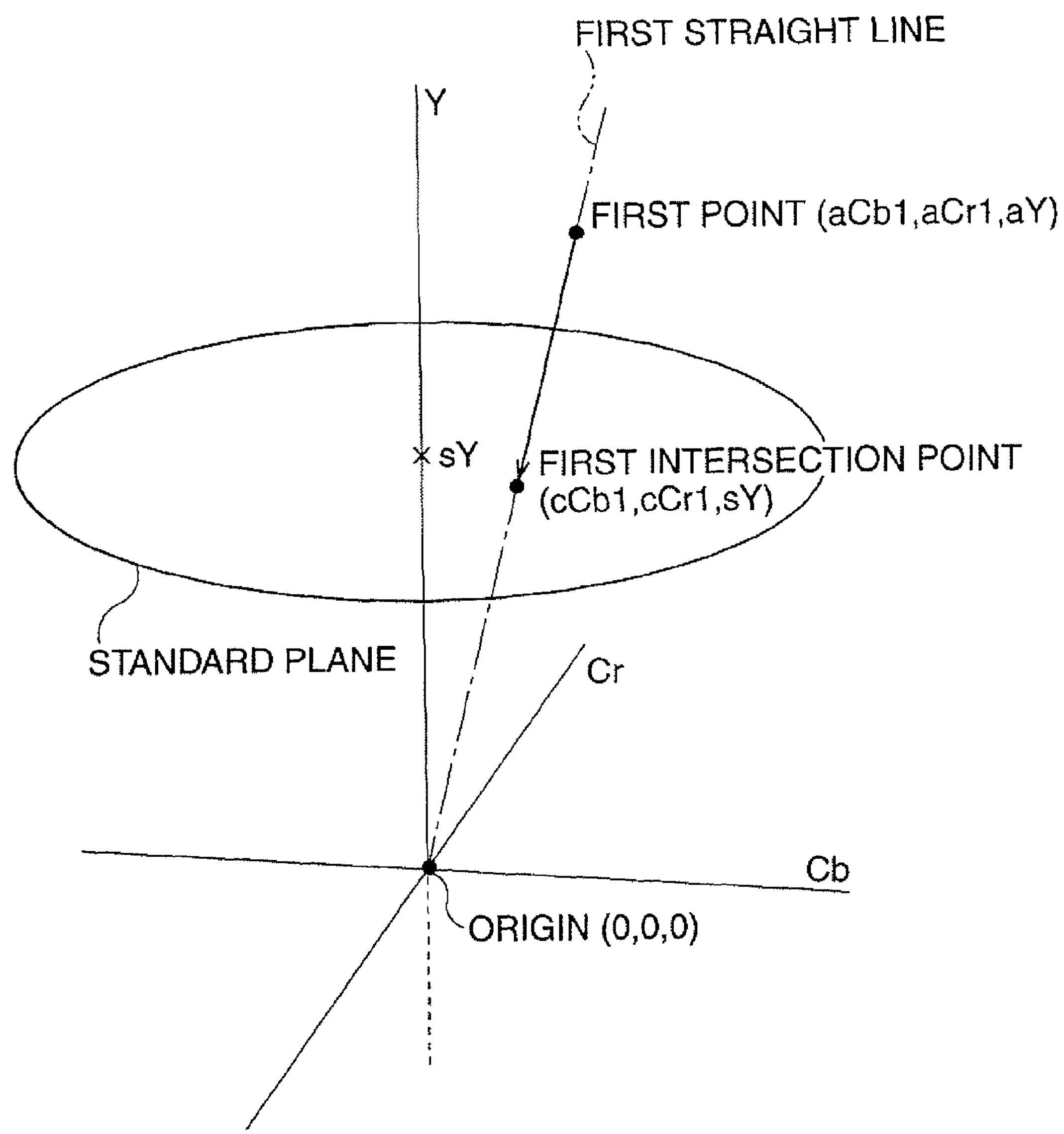
FIG. 3 is a first correlation diagram between the converted color difference signals and the add-up color difference signals.

The conversion to the cCr and the cCb is explained below using the first correlation diagram of FIG. 3. FIG. 3 is a first correlation diagram, with the cCr and the cCb corresponding to the sY, and the aCr, and the aCb corresponding to the aY, respectively. The first correlation diagram is described in a three-dimensional coordinate space, with one axis of Y, and two axes of Cr and Cb. The signal levels of the Y, the Cr, and the Cb are all zero at the origin of the coordinates in FIG. 3.

As described before, the aY, the aCr, and the aCb are calculated for each add-up area. For a first add-up area, the origin and a first point are connected by a first straight line. The coordinates of the Y, the Cr, and the Cb at the first point are, respectively, aY1, aCr1, and aCb1. There is a first intersection point of the first straight line and a standard-plane, where the coordinate of the luminance signal is sY. The coordinates of the Cr and the Cb at the first intersection point are, respectively cCr1 and cCb1. Similarly, the aCrs and the aCbs for all the add-up areas are converted into cCrs and cCbs.

The gain calculation block 24 receives the distance-information and the focal-length-information, when the imaging device generates an image signal, from the system controller 52. The gain calculation block 24 makes an approximate calculation of a photographing magnification by dividing the focal length corresponding to the focal-length-information by the object distance corresponding to the distance-information.

Further, the gain calculation block 24 receives the light-amount-information as an apex conversion value for the light amount (hereinafter referred to as Lv) from the system controller 52.

The Rg and the Bg are calculated based on the cCr and the cCb, the photographing magnification, the object distance, and the Lv.

Figure 4:
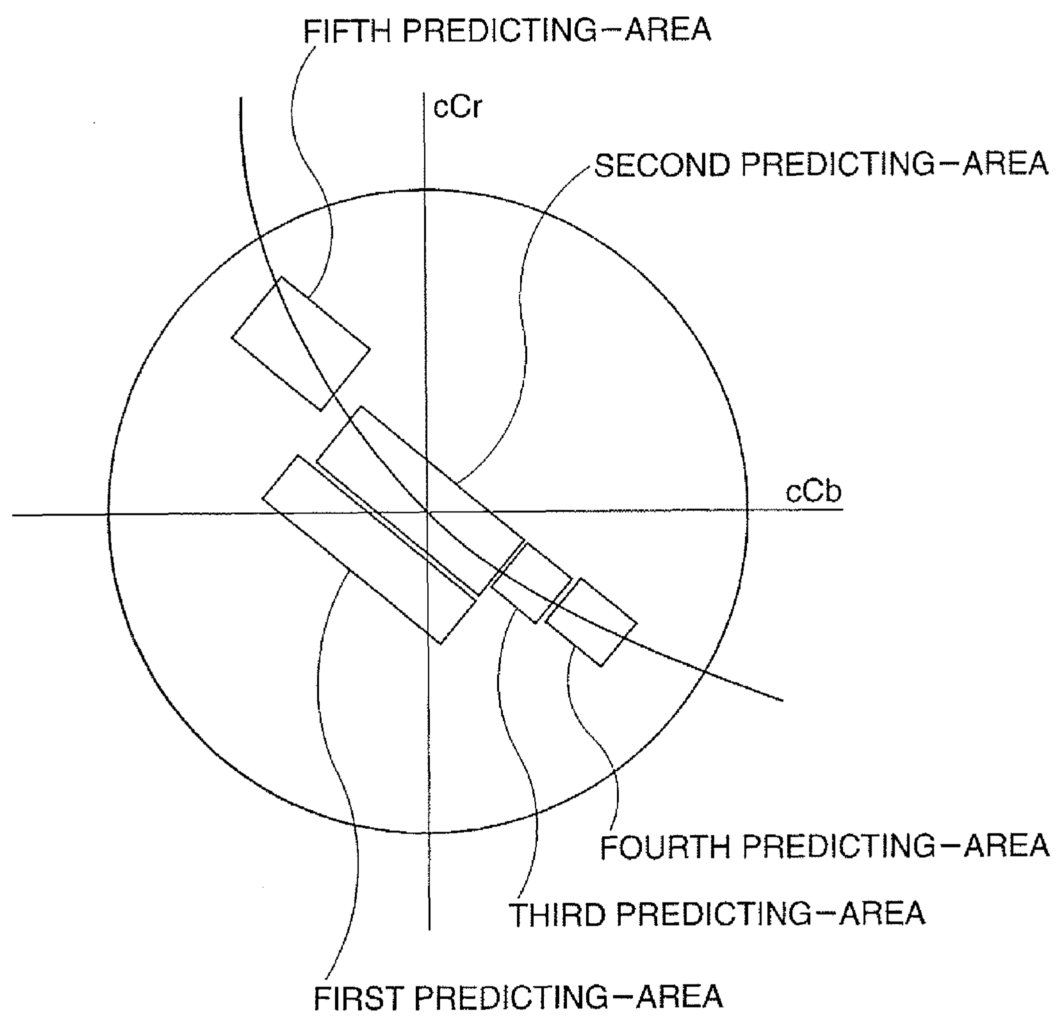
FIG. 4 is a second correlation diagram between a number of light sources and the converted color difference signals.

Initially, in order to calculate the Rg and the Bg, the gain calculation block 24 predicts actual light source illuminating the object. The method for predicting the type of the actual light source is explained below using the second correlation diagram of FIG. 4. The second correlation diagram is described in a two dimensional coordinate plain, which has the two axes of cCr and cCb.

Sunlight in a sunny place in fine weather, sunlight in a sunny place in cloudy weather, sunlight in the shade in fine weather, an incandescent light, and a fluorescent light are set up as hypothetical light sources for predicting. The light sources, of which the color temperatures are 4000K~5500K, 5500K~7000K, and 7000K~9000K, are respectively defined as sunlight in a sunny place in fine weather, sunlight in a sunny place in cloudy weather, and sunlight in the shade in fine weather. In the two dimensional coordinate plain having the two axes of cCr and cCb, some predicting-areas are predetermined. Each of the predicting-areas corresponds to one of the light sources.

When an actual light source is a fluorescent light, many of the intersection points are included in a first predicting-area. When an actual light source is sunlight in a sunny place in fine weather, many of the intersection points are included in a second predicting-area. When an actual light source is sunlight in a sunny place in cloudy weather, many of the intersection points are included in a third predicting-area. When an actual light source is sunlight in the shade in fine weather, many of the intersection points are included in a fourth predicting-area. When an actual light source is an incandescent light, many of the intersection points are included in a fifth predicting-area.

For predicting the light source, it is determined which predicting-area includes which color-points, where coordinates of one color difference signal and the other color difference signal are the cCr and the cCb of each add-up area. The cCr and the cCb, of which the color-points are not included in any predicting-areas, are excluded from predicting the actual light source.

A light source, corresponding to a predicting-area which includes the most color-points, is predicted as an actual light source, except for the specific cases described later. The cCrs and the cCbs of the color-points, included in the predicting-area corresponding to the predicted actual light source, are selected for a calculation of the Rg, and the Bg. The other cCrs/cCbs are excluded from the calculation.

Then, the average values of the selected cCrs/cCbs are calculated. Next, the sY and the average values of the selected cCrs and cCbs are converted into R signal, G signal, and B signal, The Rg is calculated by dividing the G signal by the R signal and the Bg is calculated by dividing the G signal by the B signal. As described before, data for the Rg and the Bg are sent to the white balance block 23.

Next, the specific cases for predicting the light source are explained below.

If the object distance is over a first distance, the first predicting-area is excluded from predicting the actual light source. The first distance is a predetermined distance, which can be considered as infinite for the photographic optical system. For example, the first distance can be predetermined to be 10 meters.

If the object distance is less than the first distance and greater than a second distance and the photographing magnification is over a predetermined magnification, the first predicting-area is excluded from is predicting the light source. For example, the second distance can be predetermined to be 8 meters, and the predetermined magnification can be 8.

By excluding the first predicting-area, a light source, corresponding to a predicting-area that includes the second most color-points, is then predicted as the actual light source, even if the first predicting-area includes the most color points.

If the Lv is over 12 in addition to excluding the first predicting-area, the fourth and the fifth predicting-areas are also excluded from predicting the actual light source. By excluding the first, the fourth, and the fifth predicting-areas, a light source, corresponding to either the second or the third predicting-area (whichever includes more color-points), is predicted as the actual light source.

After predicting the actual light source, the Rg and the Bg are calculated as described above. If the Lv is over 14, the Rg and the Bg are set up to be 1 even if the predicting-area includes the most color-points. Data for the Rg and the Bg are sent to the white balance block 23.

Figure 5:
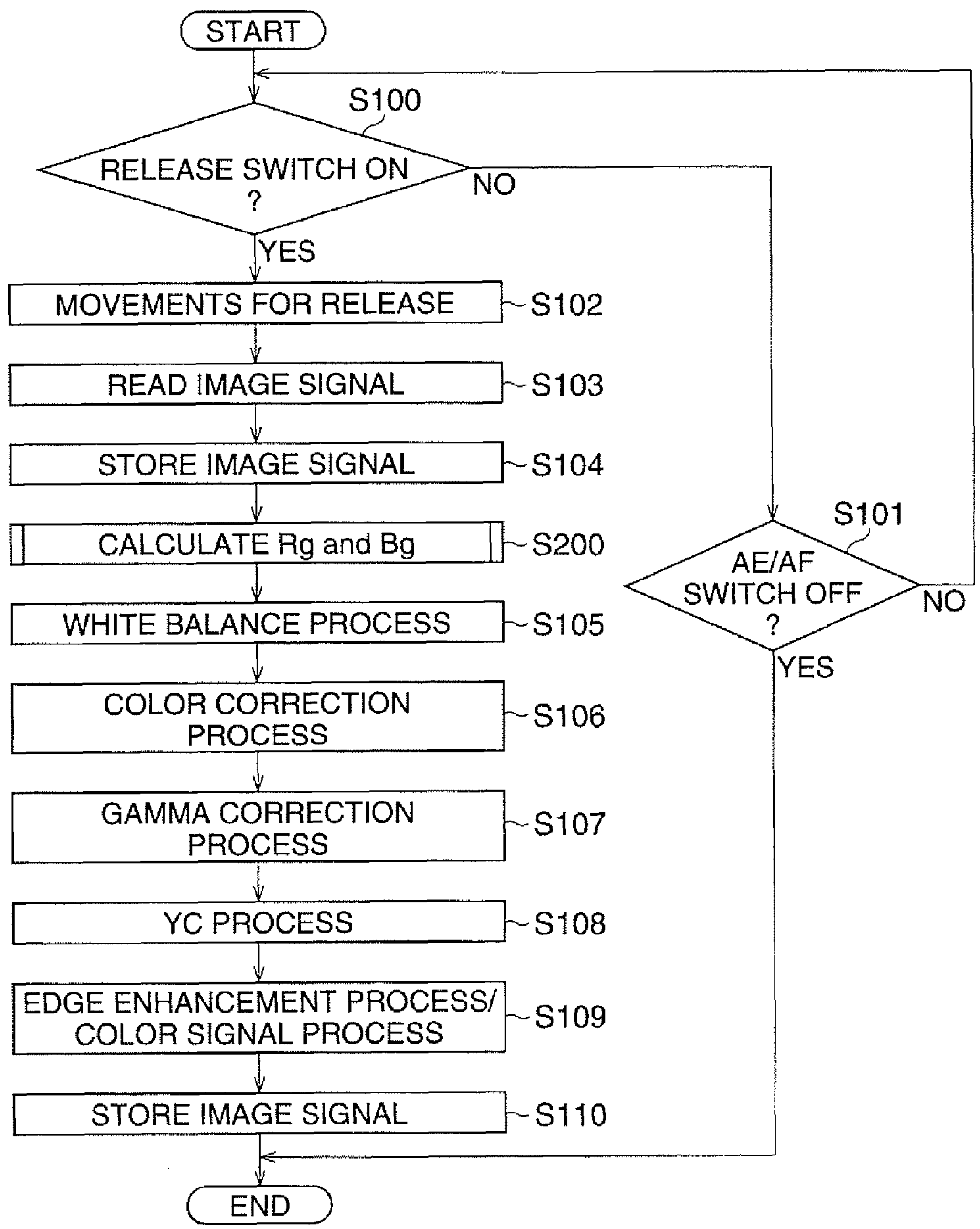
FIG. 5 is a flowchart of a number of signal processes carried out by the image signal processor.
Figure 6:
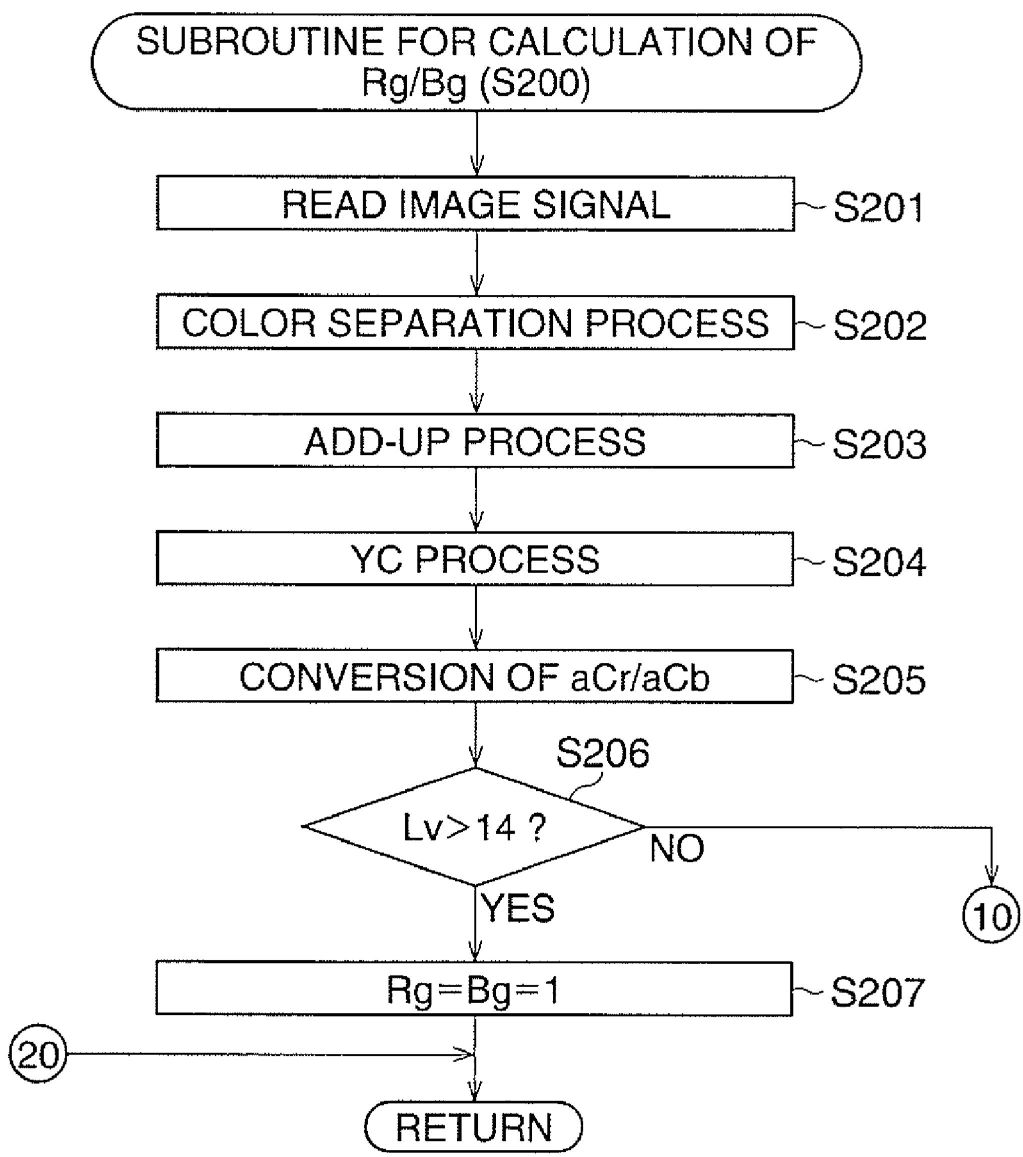
FIG. 6 is a first flowchart to explain the subroutine for a calculation of the Rg and the Bg.
Figure 7:
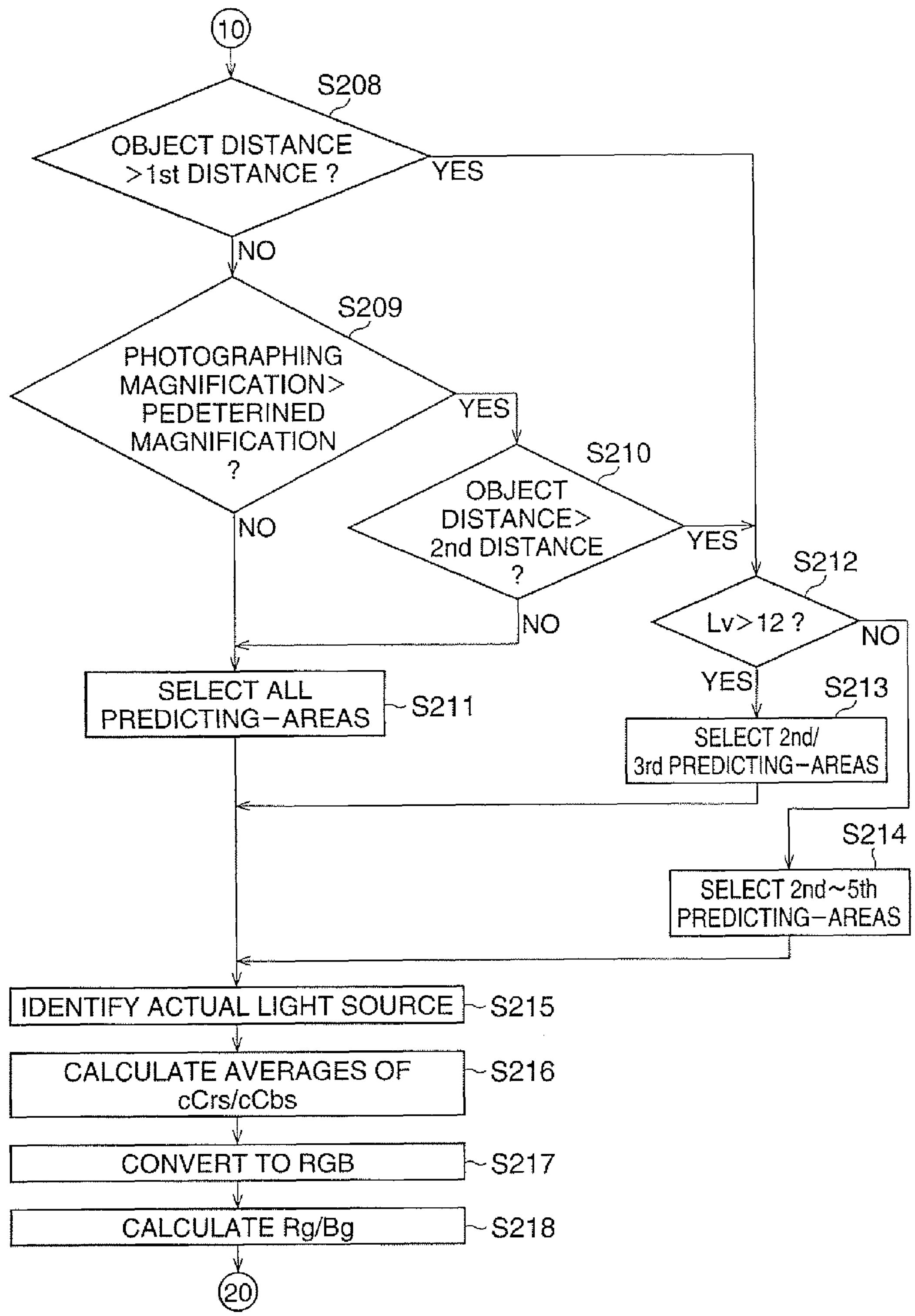
FIG. 7 is a second flowchart to explain the subroutine for a calculation of the Rg and the Bg.

Next, some movements carried out by the digital camera are explained using the flowcharts of FIG. 5~FIG. 7.

In FIG. 5, at step S100, it is determined whether the release switch 56 is switched on or not. If the release switch is switched off, the process goes to step S101. At step S101, it is determined whether the AE/AF switch 55 is switched on or not. If the AE/AF switch 55 is switched off, all operations of the digital camera 10 finish. If the AE/AF switch 55 is switched on, the process returns to step S100.

If the release switch is switched on at step S100, the process goes to step S102. At step S102, some necessary operations for release are carried out, and then the mirror 65 and the shutter 66 are opened, and the imaging device 42 is driven, so that imaging device generates an image signal.

After the operations for release are carried out, the process goes to step S103. At step S103, the correlated double sampling and the auto gain control process are carried out for the image signal. Further, A/D conversion is carried out for the image signal. After the A/D conversion, the image signal processor 20 reads the image signal. At step S104, the image signal is stored by the image memory 45. The process goes to step S200 after step S104. At step S200, the Rg and the Bg are calculated, as described below in detail.

The process goes to step S105 after calculation of the Rg and the Bg. At step S105, the white balance process is carried out using the calculated Rg and Bg. In this white balance process, first, the color separation process is carried out for the image signal stored by the image memory 45, and then the image signal is separated into the R signals, the G signals, and the B signals. Second, the R and the B signals are multiplied, by the Rg and the Bg respectively. Then the white balance process is completed.

The process goes to step S106, where the color correction process is carried out after the white balance process. Then, the gamma correction process is carried out at step S107 after the color correction process. Next, the YC process is carried out for the R signal, the G signals, and the B signals at step S108 after the gamma correction process, and then the image signal formed by the R, the G, and the B signal components are converted into the image signal formed by the Y, the Cr, and the Cb.

The process goes to step S109 after step S108. At step S109, the edge enhancement process is carried out for the Y, and the color signal process is carried out for the Cr and the Cb. At step S110, the Y, for which the edge enhancement process is carried out, and the Cr and the Cb, for which the color signal process is carried out, are stored by the image memory 45. After storing the Y and the Cr/Cb, all operations of the digital camera 10 finish.

Next, the subroutine for calculation of the Rg and the Bg at the gain calculation block 24 is explained below in detail.

In FIG. 6, the process at step S201 continues after finishing the process of step S104. At step S201, the gain calculation block 24 reads the image signal, the distance-information, the focal-length-information, and the light-amount-information.

At step S202, the color separation process is carried out for the image signal, and then the R signal, the G signal, and the B signal, which are components of the image signal, are separated.

At step S203, the add-up process is carried out for the R signal, the G signal, and the B signal that are separated at step S202, and then the R add-up value, the G add-up value, and the G add-up value are calculated.

At step S204, the aY, the aCr, and the aCb are generated based on the R add-up value, the G add-up value, and the B add-up value. At step S205, the aCr and the aCb are converted into the cCr and the cCb.

At step S206, it is determined whether the Lv is over 14 or not. If the Lv is over 14, the process goes to step S207. At step S207, the Rg and the Bg are set to 1. The white balance process is unnecessary if the Lv is over 14. The Rg and the Bg set to 1, a value that corresponds to skipping the virtual white balance, are used for the white balance process at step S105.

The process goes to step S208 when the Lv is not over 14 at step S206. At step S208, it is determined whether the object distance is greater than the first distance, which can be considered infinite. If the object distance is greater than the first distance, the process goes to step S212. Fluorescent light is excluded when predicting the actual light source at all steps after step S212, to be described later. The reason for this exclusion is that it can be judged that the object is out of doors if the object distance is infinite.

If the object distance is not greater than the first distance at step S208, the process goes to step S209. At step S209 and step S210, it is determined whether the photographing magnification is greater than the predetermined magnification, and whether the object distance is greater than the second distance, respectively. If the photographing magnification is greater than the predetermined magnification and the object distance is greater than the second distance, the process goes to step S212.

If the photographing magnification is not greater than the predetermined magnification or the object distance is not greater than the second distance, the process goes to step S211. At step S211, all predicting-areas are selected to predict the actual light source.

At step S212, it is determined whether the Lv is greater than 12. If the Lv is greater than 12, the process goes to step S213, and then the second and the third predicting-areas are selected to predict the actual light source. The Lv is considered greater than 12 if the actual light source is sunlight in a sunny place in fine weather or sunlight in a sunny place in cloudy weather. Consequently, the selection of the predicting-areas at step S213 is appropriate.

When the Lv is not greater than 12 at step S212, the process goes to step S214. At step S214, all predicting-areas, excluding the first predicting-area, are selected to predict the actual light source.

The process goes to step S215 after step S211, step S213, or step S214 finishes. At step S215, the predicting-area that includes the most color-points is detected from among the selected predicting-areas at step S211, step S213, or step S214. The actual light source is identified by detecting the predicting-area.

The process goes to step S216 after identification of the actual light source. At step S216, the average value of the cCrs/cCbs, of which color-points are included in the identified predicting-area at step S215, is calculated.

The process goes to step S217 after the calculation. At step S217, the sY and the average values calculated at step S216 are converted into an R signal, a G signal, and a B signal. At step S218, the Rg is calculated by dividing the R signal by the G signal. Further, at step S218, the Bg is calculated by dividing the B signal by the G signal.

The subroutine finishes after calculating the Rg and the Bg, and then the process goes to step S105 as described before.

In the above embodiment, it is possible to carry out an adequate white balance without user intervention for setting up a photographing-mode. Further, an adequate white balance can be carried out even if the user sets up a photographing-mode inadequate to the condition where a photograph is taken.

When an object mostly colored green is photographed outside in sunny weather, a white balance for an object illuminated by fluorescent light may be carried out according to a method of white balance in prior art. However, it is possible to prevent inadequate white balance even under such conditions in the above embodiment.

The first distance is set at 10 meters in the above embodiment. However, any distances are adaptable as long as the photographing location can be considered outside. Further, the second distance and the predetermined magnification are set at 8 meters and 8, respectively in the above embodiment. However, the combination of the second distance and the photographing magnification is adaptable as long as the photographing location can be considered outside.

A specific light source can be excluded from predicting the actual light source based on the object distance and the photographing magnification. However, the exclusion may be carried out based on either the object distance or the photographing magnification by itself.

A defocusing distance of the photographic optical system 41 is measured by the AF sensor 58 in the above embodiment. However, the defocus amount can be measured by the imaging device 42. For instance, in a compact camera where the imaging device always receives an optical image, this setting is applicable.

Furthermore, in the above embodiment, the focus optical system 41F is moved a distance based on the defocusing distance detected by the AF sensor 58, and then the object distance is detected based on the new location of the focus optical system 41F. However, the object distance may be directly measured by a range-finding sensor as well.

The add-up process is carried out by the gain calculation block 24 in the above embodiment. However, an adequate white balance can be carried out without the add-up process. Nevertheless, it is desirable to carry out the add-up process because it facilitates a quick calculation of the Rg and the Bg. In addition, the carrying out of the add-up process does not present any problems, since adequate Rg and Bg are still calculated.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2005-193944 (filed on Jul. 1, 2005), which is expressly incorporated herein, by reference, in its entirety.

The invention claimed is:

1. An image signal processor, comprising:

an image signal receiver that receives an image signal generated by an imaging device when said imaging device captures an optical image of an object through a photographic optical system, the photographic optical system having a focus optical system that focuses said optical image on a light receiving surface of said imaging device, and the photographic optical system being housed in a lens unit having a detector that determines an object distance based on a location of said focus optical system in said photographic optical system;

a white balance processor that performs a white balance process for said image signal, based on a photographing magnification of said photographic optical system, said object distance, and light intensity of said optical image as said image signal is generated by said imaging device;

a color separator that separates said image signal into primary color signal components for each picture element forming a light receiving surface of said imaging device, and a signal converter that converts said primary color signal components into first and second color difference signals;

a plurality of predicting-areas, on a two dimensional coordinate plane of said first and said second color difference signals, are predetermined for predicting an actual light source illuminating said object;

said white balance processor calculates a white balance gain used for multiplying said image signal, based on average values of said first color difference signals of said picture elements and said second color difference signals of said picture elements, and performing said white balance process for said image signal with said white balance gain; and said white balance processor calculates said white balance gain, based on average values of said first and said second color difference signals whose color combination for said picture elements are included only in one of said predicting-areas that is selected, from said plurality of predicting areas, based upon including the most of said color combinations.

2. An image signal processor according to claim 1, wherein said photographing magnification is calculated based on said object distance and a focal length of said photographic optical system.

3. An image signal processor according to claim 1, wherein said photographic optical system has a zooming optical system that adjusts a focal length of said photographic optical system.

4. The image signal light processor according to claim 1, said white balance processor calculating the white balance gain based upon the picture elements included only in said one of said plurality of predicting areas even when the light of the light source includes components in plural ones of said plurality of predicting areas.

5. An image signal processor, comprising:

an image signal receiver that receives an image signal generated by an imaging device when said imaging device captures an optical image of an object through a photographic optical system, the photographic optical system having a focus optical system that focuses said optical image on a light receiving surface of said imaging device, and the photographic optical system being housed in a lens unit having a detector that determines an object distance based on a location of said focus optical system in said photographic optical system;

a white balance processor that performs a white balance process for said image signal, based on a photographing magnification of said photographic optical system, said object distance, and light intensity of said optical image as said image signal is generated by said imaging device;

a color separator that separates said image signal into primary color signal components for each picture element forming a light receiving surface of said imaging device, and a signal converter that converts said primary color signal components into first and second color difference signals;

a plurality of predicting-areas, on a two dimensional coordinate plane of said first and said second color difference signals, are predetermined for predicting an actual light source illuminating said object;

said predicting-areas comprise a first predicting-area, corresponding to a first light source, and a second predicting-area, corresponding to a second light source;

said white balance processor calculates a white balance gain for multiplying said image signal, based on average values of said first color difference signals of said picture elements and said second color difference signals of said picture elements, and performing said white balance process for said image signal with said white balance gain; and said white balance processor calculates said white balance gain, based on average values of said first and said second color difference signals whose color combination for said picture elements are included only in said predicting-area that includes the most of said color combinations except for said first and said second predicting-areas, when said object distance is greater than a first distance and said light intensity of said optical image is greater than a predetermined intensity; or when said object distance is within a range between said first distance and a second distance that is shorter than said first distance, said photographing magnification is greater than a predetermined magnification, and said light intensity of said optical image is greater than said predetermined intensity.

6. An image signal processor according to claim 5, wherein said white balance processor calculates said white balance gain, based on average values of said first and said second color difference signals whose color combination for said picture elements are included only in said predicting-area that includes the most of said color combinations except for said first predicting-area, if said object distance is greater than said first distance and said light intensity of said optical image is less than said predetermined intensity, or if said object distance is in a range between said first distance and said second distance, said photographing magnification is greater than a predetermined magnification, and said light intensity of said optical image is less than said predetermined intensity.

7. An image signal processor according to claim 5, wherein said white balance processor calculates said white balance gain, based on average values of said first and said second color difference signals whose color combination for said picture elements are included only in said predicting-area that includes the most of said color combinations, if said photographing magnification is less than said predetermined magnification, or if said photographing magnification is greater than said predetermined magnification and said object distance is less than said second distance.

8. An image signal processor according to claim 5, wherein said first light source is predetermined to be a fluorescent light.

9. An image signal processor according to claim 5, wherein said second light source is predetermined to be shaded sunlight in fine weather or an incandescent light.

10. An image signal processor according to claim 5, wherein said photographing magnification is calculated based on said object distance and a focal length of said photographic optical system.

11. An image signal processor according to claim 5, wherein said photographic optical system has a zooming optical system that adjusts a focal length of said photographic optical system.

12. An image signal processor, comprising:

an image signal receiver that receives an image signal generated by an imaging device when said imaging device captures an optical image of an object through a photographic optical system, the photographic optical system having a focus optical system that focuses the optical image on a light receiving surface of said imaging device, the photographic optical system being associated with a lens unit having a detector that determines an object distance based on a position of said focus optical system in said photographic optical system;

a white balance processor that performs a white balance process for said image signal, based on a photographing magnification of said photographic optical system, said object distance, and light intensity of said optical image as said image signal is generated by said imaging device;

a color separator that separates said image signal into primary color signal components for each picture element forming a light receiving surface of said imaging device, and a signal converter that converts said primary color signal components into first and second color difference signals;

a plurality of predicting areas, on a two dimensional coordinate plane of said first and said second color difference signals, are predetermined for predicting an actual light source illuminating said object, each of the plurality of predicting areas being defined based upon a nature of a particular light source;

said white balance processor calculates a white balance gain for multiplying said image signal, based on average values of said first color difference signals of said picture elements and said second color difference signals of said picture elements, and performing said white balance process for said image signal with said white balance gain; and said white balance processor calculates said white balance gain by excluding at least one of said plurality of prediction areas in accordance with a predetermined condition and selects, of said remaining ones of said plurality of prediction areas, a prediction area based upon which of the remaining prediction areas includes the most color combinations of average values of said first and second color difference signals for said picture areas.

13. The image signal processor according to claim 12, wherein said photographing magnification is calculated based upon said object distance and a focal length of said photographic optical system.

14. The image signal processor according to claim 12, wherein said photographic optical system comprises a zooming optical system that adjusts a focal length of said photographic optical system.

15. The image signal processor according to claim 12, wherein one of said light sources is predetermined to be a fluorescent light.

16. The image signal processor according to claim 12, wherein one of said light sources is predetermined to be shaded sunlight in fine weather or an incandescent light.

* * * * *